United States Patent [19]

Mörsky et al.

[11] Patent Number: 5,030,032
[45] Date of Patent: Jul. 9, 1991

[54] APPARATUS FOR PRODUCING WATER SEAL IN PROTECTIVE TUBE OF THE SUBMERSED PUMP OF GAS CISTERN

[75] Inventors: Esa Mörsky; Risto Penttinen, both of Porvoo, Finland

[73] Assignee: Neste Oy, Finland

[21] Appl. No.: 488,089

[22] PCT Filed: Nov. 15, 1989

[86] PCT No.: PCT/FI89/00207
§ 371 Date: Jun. 25, 1990
§ 102(e) Date: Jun. 25, 1990

[87] PCT Pub. No.: WO90/05687
PCT Pub. Date: May 31, 1990

[30] Foreign Application Priority Data
Nov. 15, 1988 [FI] Finland .................................. 885281

[51] Int. Cl.[5] .......................... B65G 5/00; E21F 17/18
[52] U.S. Cl. ........................................ 405/53; 166/68; 166/105.1
[58] Field of Search ............... 405/53, 55, 59; 166/68, 166/105.1, 105.3, 105.4, 369; 220/85 S

[56] References Cited

U.S. PATENT DOCUMENTS

| 3,084,515 | 4/1963 | Dougherty | 405/53 |
| 3,089,309 | 5/1963 | Closs et al. | 405/53 |
| 3,491,540 | 1/1970 | Lennemann | 405/53 |
| 3,530,674 | 9/1970 | Cobbs et al. | 405/53 |
| 4,592,677 | 6/1986 | Washer | 405/59 |

FOREIGN PATENT DOCUMENTS

| 3234914 | 4/1984 | Fed. Rep. of Germany | 405/53 |
| 90301 | 6/1982 | Japan | 405/53 |

Primary Examiner—Dennis L. Taylor
Assistant Examiner—John Ricci
Attorney, Agent, or Firm—Steinberg & Raskin

[57] ABSTRACT

The present invention concerns an apparatus for producing a water seal in a protective tube (16) of a submersed pump (15) of a gas cistern (10), on the lower end thereof being a bend (16a) or a tubular structure (16c) enabling the producing of a water seal. The apparatus comprises a chamber (30), which with two or several tubes (32,35) communicates with the top end of the protective tube (16), and valves (31,33,34,36) with the aid of which the filling of the chamber with water may be carried out in subsequent operational steps, whereby the gas contained in the chamber (30) simultaneously discharges from the chamber (30), and the forcing of the water enclosed in the chamber (30) into said protective tube (16) with the pressure of the gas prevailing therein, whereby, by carrying out said subsequent operational steps, the pressure of the gas of the protective tube (16) can be made to fall to the level of the atmospheric pressure.

2 Claims, 4 Drawing Sheets

APPARATUS FOR PRODUCING WATER SEAL IN PROTECTIVE TUBE OF THE SUBMERSED PUMP OF GAS CISTERN

BACKGROUND OF THE INVENTION

The present invention concerns an apparatus for producing a water seal in a protective tube of a submersed pump of a gas cistern with the aid of which apparatus the pump can be safely serviced or replaced without the risk that liquefied gas would enter the protective tube.

Liquefied gases may, as is known in the art, be stored in rock cisterns in which the leakage water from the rock is gathered on the bottom of said cistern to form a water bed. With the aid of the water bed, also the surface height of the liquefied gas can be regulated in the cistern.

Liquefied gases are generally removed from the cistern with the aid of a submersed pump placed in a protective tube. The protective tube makes it feasible that the submersed pump can, if needed, be detached for servicing or replacement. However, this operation prerequires that the protective tube can be emptied from gas and that the gas entry into the protective tube can be prevented during a servicing measure.

A problem solution for replacing and maintaining submersed pumps is to provide a water seal on the lower end of the protective tube, whereby penetration of gas into the protective tube is prevented. In order to produce a water seal, the protective tube may form a U-shaped bend in that the tube incoming end is on a higher level than the lowermost point of the tube and that it extends to the liquefied gas layer on a plane which within the cistern is higher than the surface of the water bed. The provision of the water seal starts so that pressurized nitrogen gas is conducted into the protective tube to the extent that the surface of the liquefied gas within the protective tube falls to the adjacency of the bend located in the lower end of the protective tube. Thereafter, water is added into the protective tube, whereby a water seal is produced in the bend of the protective tube. After that, pressurized nitrogen gas is discharged from the protective tube and, at the same time, an equivalent quantity of water is added into the protective tube, whereby the water seal is preserved in place.

A problem related to the production of a water seal of this type is that an appropriate quantity of water must be added into the protective tube per discharging nitrogen gas unit. However, measuring such gas quantity under field conditions is a cumbersome task. If too little water is added therein, there is a risk that the water seal breaks and liquefied gas flows into the protective tube. This creates a great hazard in an instance in which the breaking of the water seal occurs while the upper end of the protective tube is open when replacing the pump. If too much water is added therein, it will flow through the protective tube into the rock cistern without being observed at all. The excessive quantity of water may cause difficulties in the operation of the rest of the pumps if the surface of the water rises too high.

SUMMARY OF THE INVENTION

The object of the present invention is an apparatus for producing a water seal in a protective tube of a submersed pump in that the water quantity added into the protective tube is equivalent to the gas quantity removed from said protective tube, and no measuring of the removable gas or pressure and the quantity of the water to be fed need be carried out, and nevertheless, it is possible to ensure that the water seal is sufficiently strong, whereby the upper end of the protective tube can, after ventilation, be opened safely for the servicing or replacement of the submersed pump.

The apparatus of the invention for producing a water seal in a protective tube of the submersed pump of a gas cistern, said tube being provided on its lower end with a bend or a tube structure enabling provision of a water seal, is characterized in that the apparatus comprises a chamber which is with two or several tubes connected with the upper end of the protective tube, and valves with the aid of which the filling of the chamber with water can be carried out in subsequent steps, whereby the gas included in the chamber is conducted out of said chamber, and the forcing of the water enclosed in the chamber into the protective tube using the pressure of the gas prevalent in the protective tube, whereby, when carrying out said subsequent steps of operation, the gas pressure of the protective tube is made to fall to the level of the atmospheric pressure prevailing in the atmosphere.

BRIEF DESCRIPTION OF THE DRAWINGS

The invention is described more in detail, referring to the accompanying figures in which.

DESCRIPTION OF THE PREFERRED EMBODIMENTS

Figure 1:
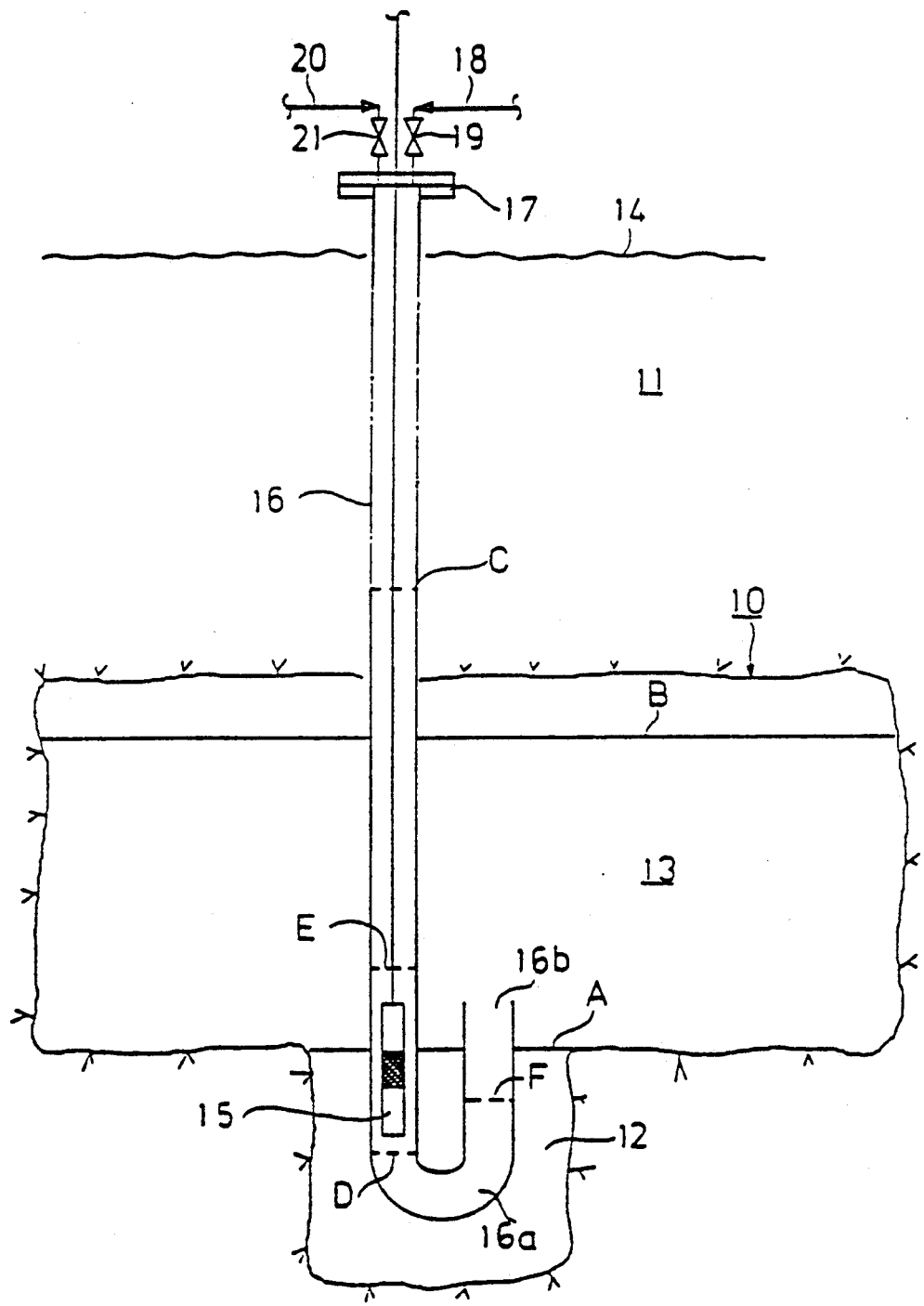
FIGS. 1 and 2 present a conventional design for producing a water seal in a protective tube of a submersed pump.
Figure 2:
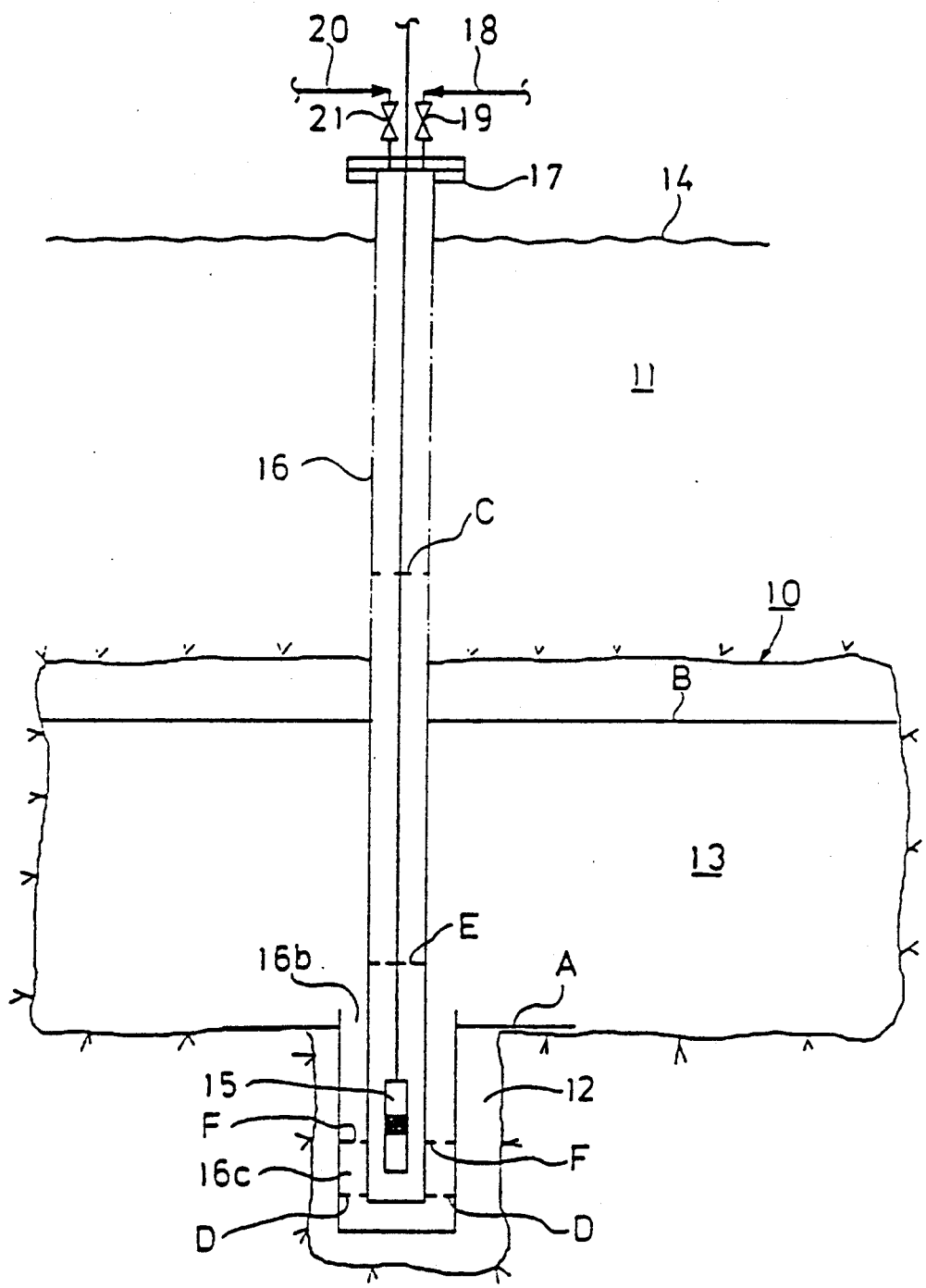

FIGS. 1 and 2 present a storing cistern for liquefied gas established in bedrock 11. On the bottom of the cistern 10 is located a water bed 12, its upper surface being on the plane A. On top of the water bed 12 is located a liquefied gas layer 13, its upper surface being on plane B. The protective tube 16 of the submersed pump extends from the surface to the water bed 12 in the rock cistern, provided with a bend 16a on its lower end (FIG. 1), or a tubular structure 16c (FIG. 2), its intake end 16b extending to the liquefied gas layer 13. On the upper end of the protective tube 16 is positioned a cover construction 17, connected therewith being a nitrogen supply tube 18 and a water feed tube 20, to which is connected a valve 21.

In the apparatus of FIGS. 1 and 2, the water seal is formed as follows. First, pressurized nitrogen gas is fed into a protective tube 16 through the nitrogen gas supply tube 18 and the valve 19. Thereby, the surface of the liquefied gas inside the protective tube 16 descends from the level C to level D, corresponding to the situation in FIG. 1. This it is assured that as small quantity as possible of liquefied gas is left above the water seal. Thereafter, water is let into the protective tube 16 through the tube 20 and the valve 21, whereby a water seal is formed on the bend 16a or the tubular structure 16c of the protective tube 16. Thereafter, discharging of the nitrogen is started from the protective tube 16 through the valve 19 into the tube 18, and at the same time, water is conducted through the tube 20 and the valve 21 into the protective tube 16. Water is allowed to run as long as the pressure of the nitrogen gas in the protective tube 16 has fallen to the atmospheric pressure. Thereby, the protective tube 16 is provided with a water seal, its water surfaces being indicated by reference numerals E and F in FIG. 1.

In the apparatus of FIG. 1 and 2, the gas quantity to be removed from the protective tube 16, and hence, the requisite quantity of water to be supplied are extremely difficult to measure, so that no guarantee concerning the sufficiency of the formed water seal may be given.

Figure 3:
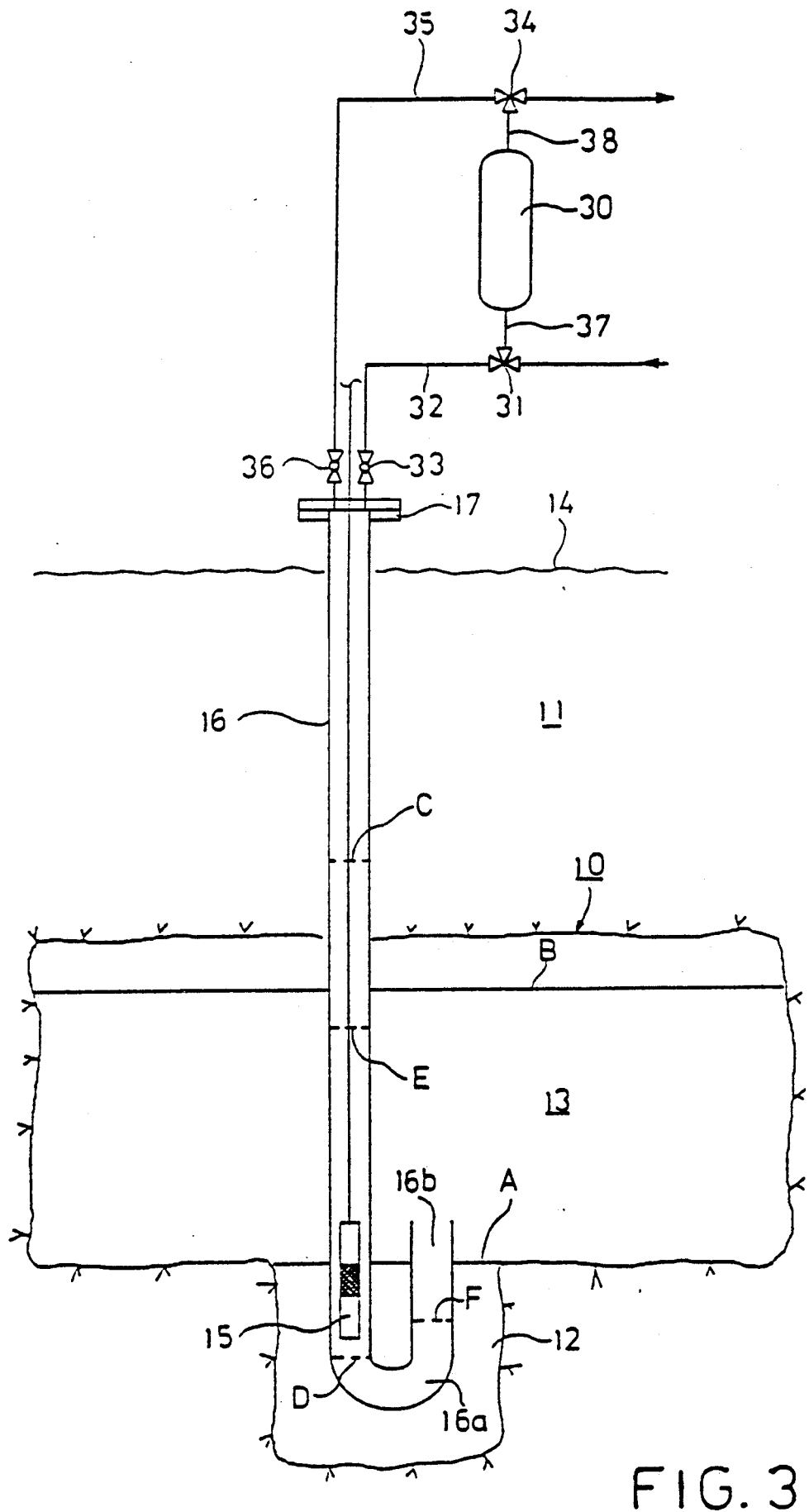
FIGS. 3 and 4 present the apparatus of the invention for producing a water seal.
Figure 4:
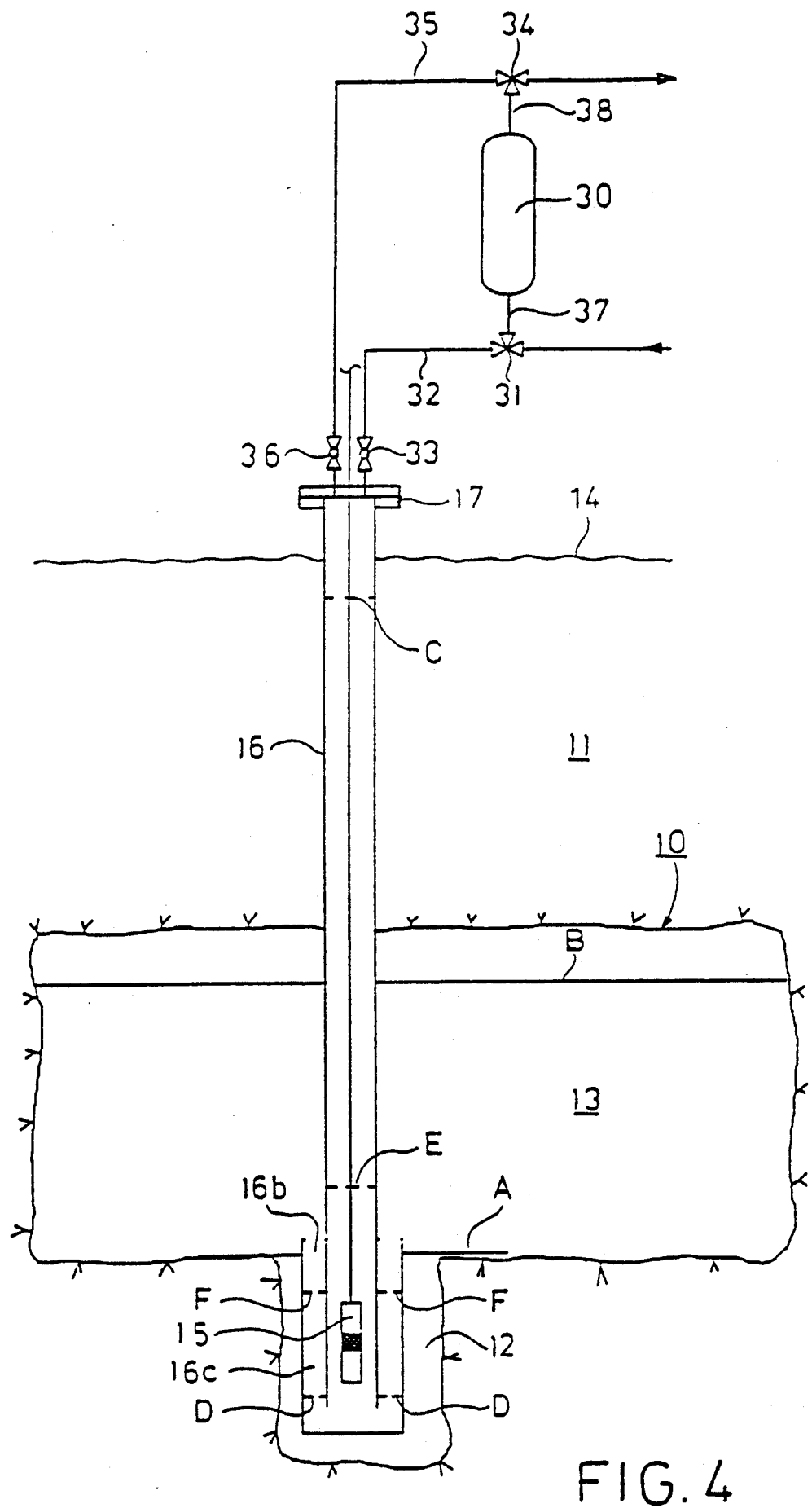

In FIGS. 3 and 4 is presented the apparatus of the invention for producing a water seal in the protective tube 16 of the submersed pump 15 of a liquefied gas cistern 10. The design of the cistern 10 and the protective tube 16 is equivalent to those in FIGS. 1 and 2. The design of the invention comprises a chamber 30 which at the lower end communicates through a valve 31, a tube 32 and a valve 33 connected with the protective tube 16, and at the upper end, through a valve 34, a tube 35 and a valve 36, similarly with the protective valve 16. The tube 32 is a water feeding tube and the valve 31 is composed of a three-way valve or of several valves providing an equivalent operation. The tube 35 is a gas feeding tube, and likewise, the tube 34 is composed of one three-way valve or several valves providing an equivalent operation. In the embodiments of FIGS. 3 and 4, the chamber 30 communicates at the lower part through a tube 37 with the tube 32, and at the upper part through a tube 38 with the tube 35.

The water seal in the apparatus of FIGS. 3 and 4 is formed basically in the same way as in the apparatus of FIGS. 1 and 2. Pressure reduction in the protective tube 16 is carried out as follows. The chamber 30 is filled with water along the route 32,31 and 37, whereby the gas prevalent in the chamber 30 discharges into the atmosphere. Thereafter, the valves are turned so that the gas prevailing in the protective tube 16 may along the route 35,34 and 38 enter the chamber 30 and force the water to pass from the chamber 30 along the route 37,31,32 into the protective tube 16. Thereby, a quantity of water which is equivalent to the quantity of the gas exited from the protecting tube 16 enters into the protective tube 16. In this manner it has been assured that the water seal located in the protective tube 16 is maintained there and will not break out. Thereafter, the chamber 30 is again filled with water along the route 32,31 and 37, whereby the gas prevailing in the chamber 30 discharges. This circulation is continued until the pressure in the protective tube 16 has fallen to the level of the atmospheric pressure, whereby the cover structure 17 of the protective tube 16 can be opened safely, and the submersed pump 15 be lifted up for maintenance or replacement.

It goes without saying that the apparatus of the present invention is not merely confined to liquefied gas cisterns and underground cisterns; on the contrary, to all such cisterns in which the entry of detrimental gases or liquids can with the aid of a water seal be prevented from entering a protective tube of a submersed pump.

We claim:

1. An apparatus for producing a water seal in a protective tube of a submersed pump of a gas cistern, on the lower end whereof being a bend or a tubular structure enabling the formation of a water seal, wherein the apparatus comprises a chamber which with two or several tubes communicates with the upper end of the protective tube, and valves, with the aid of which the filling of the chamber with water may be carried out in subsequent operational steps, whereby gas contained in the chamber discharges at the same time from the chamber as it is filled with water, and with the aid of which gas, the forcing of the water contained in the chamber into the protective tube using the pressure of the gas prevalent in said tube is accomplished, whereby by carrying out said subsequent operational steps, the gas pressure of the protective tube can be made to fall to the level of the atmospheric pressure.

2. An apparatus for producing a water seal in a protective tube of a submersed pump of a gas cistern, on the lower end whereof being a bend or a tubular structure enabling the formation of a water seal, wherein the apparatus comprises a chamber which with two or several tubes communicates with the upper end of the protective tube, and valves, with the aid of which the filling of the chamber with water may be carried out in subsequent operational steps, whereby gas contained in the chamber discharges at the same time from the chamber as it is filled with water, and with the aid of which gas, the forcing of the water contained in the chamber into the protective tube using the pressure of the gas prevalent in said tube is accomplished, whereby by carrying out said subsequent operational steps, the gas pressure of the protective tube can be made to fall to the level of the atmospheric pressure; and wherein the valves communicating directly with the chamber are three-way valves.

* * * * *